No. 872,576. PATENTED DEC. 3, 1907.
D. F. NISBET.
GAS PURIFIER.
APPLICATION FILED JULY 8, 1907.
4 SHEETS—SHEET 1.
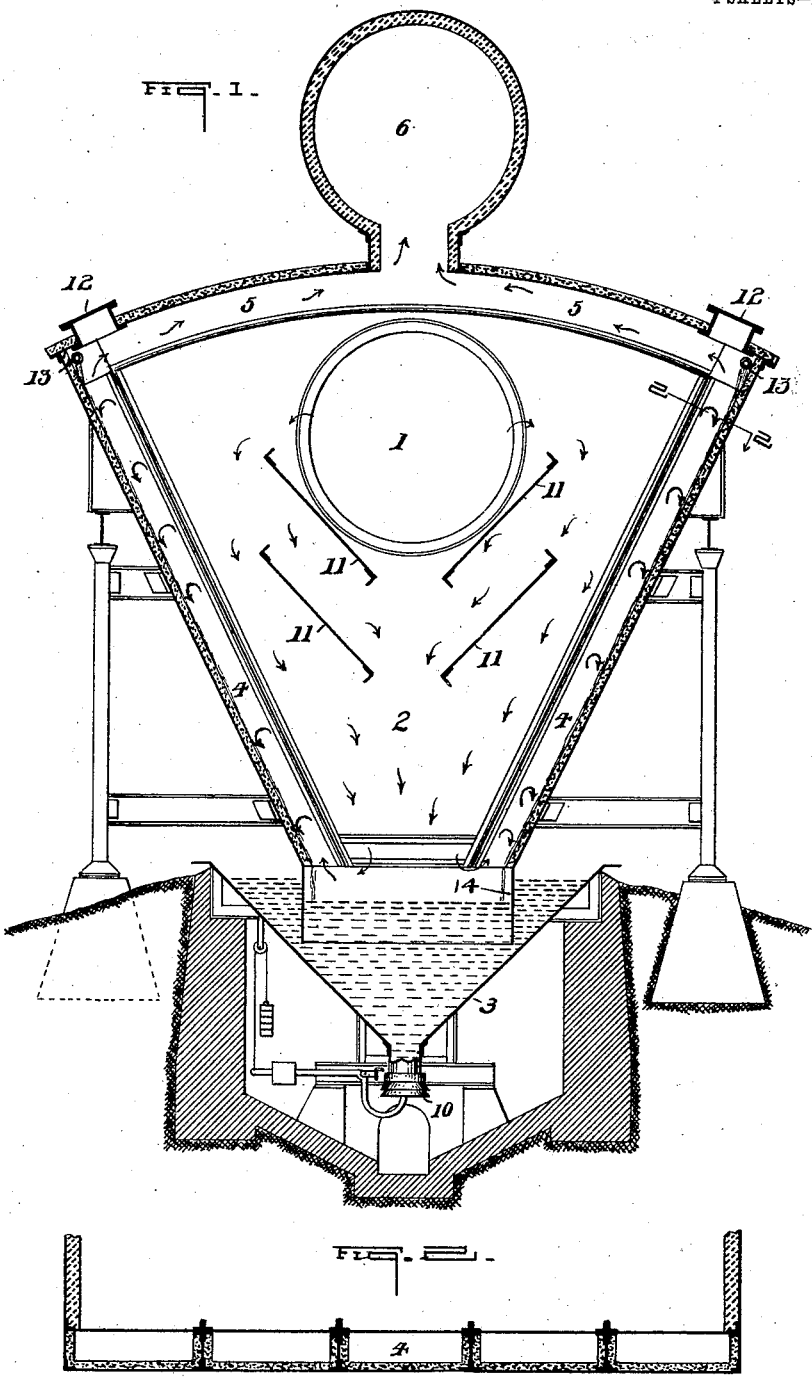

No. 872,576.
PATENTED DEC. 3, 1907.
D. F. NISBET.
GAS PURIFIER.
APPLICATION FILED JULY 8, 1907.
4 SHEETS—SHEET 2.
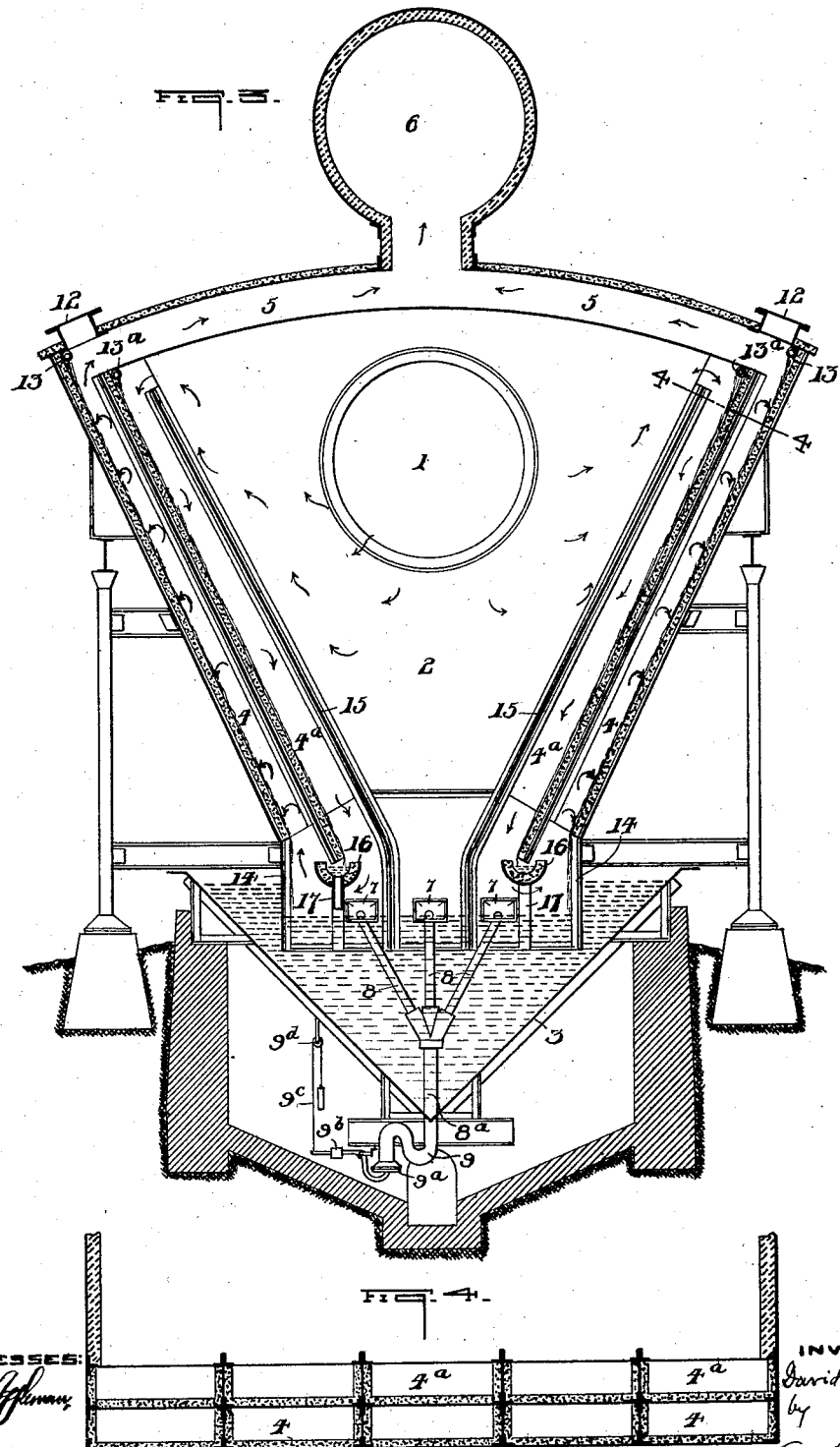

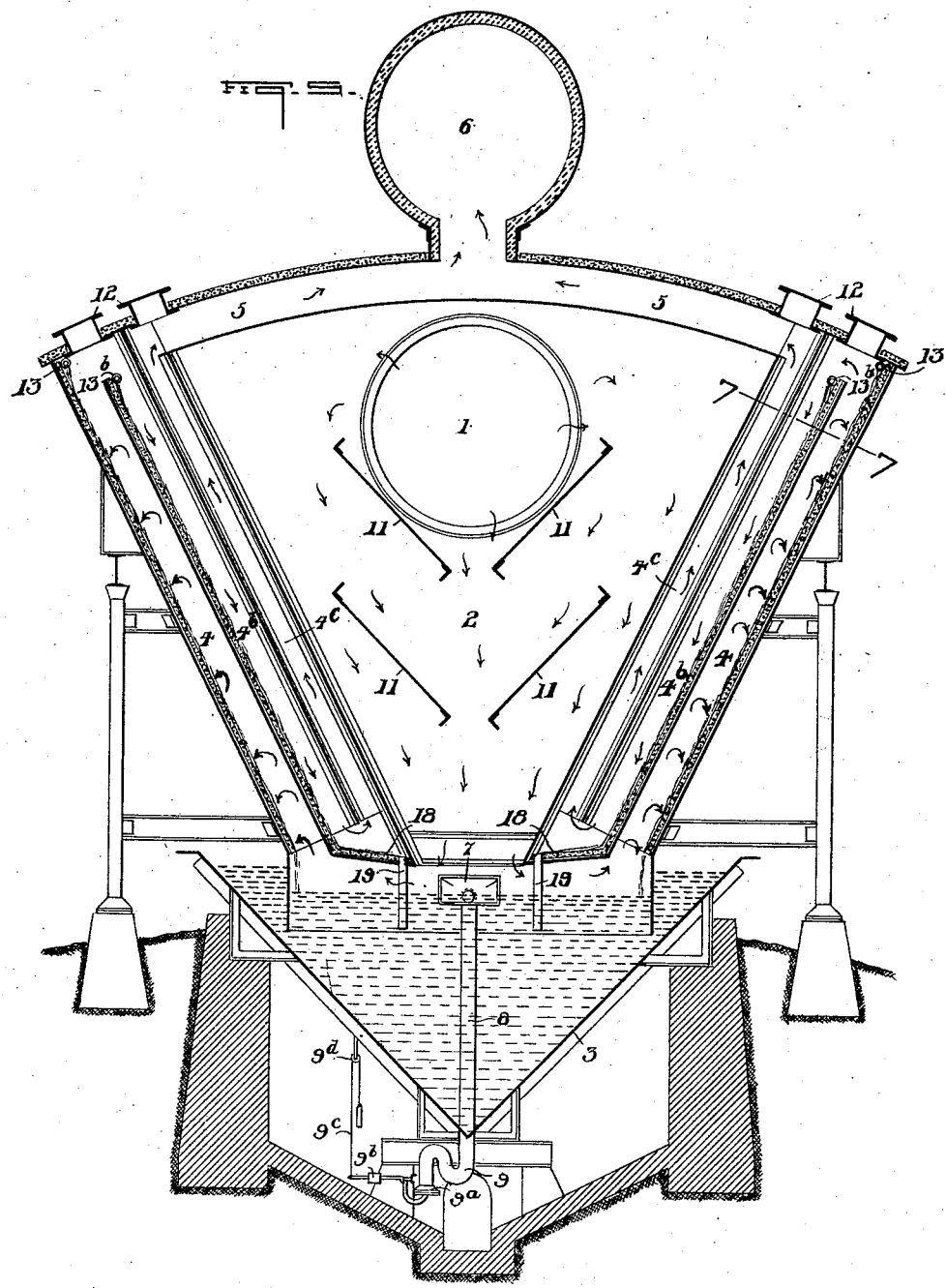

No. 872,576.
PATENTED DEC. 3, 1907.
D. F. NISBET.
GAS PURIFIER.
APPLICATION FILED JULY 8, 1907.
4 SHEETS—SHEET 4.
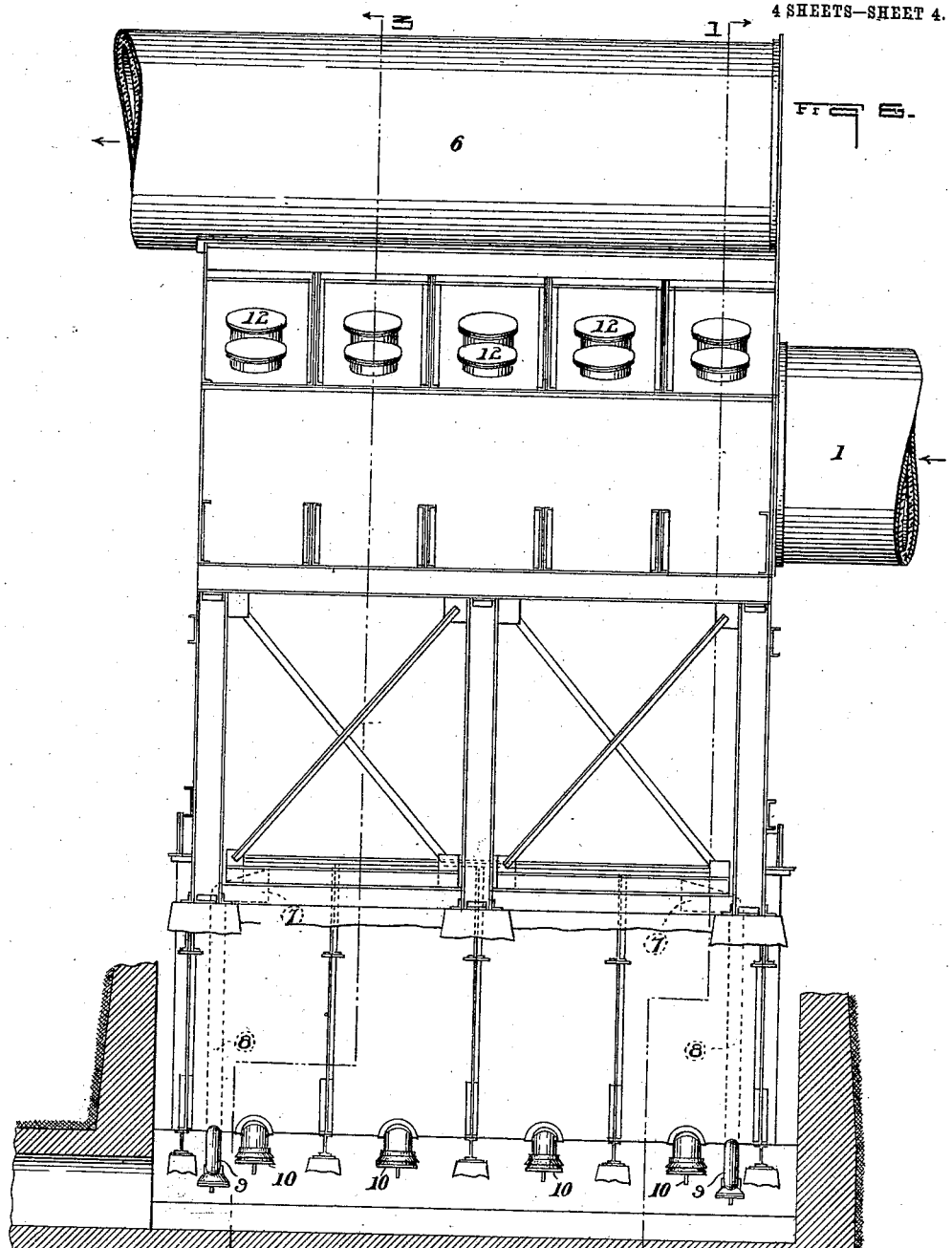
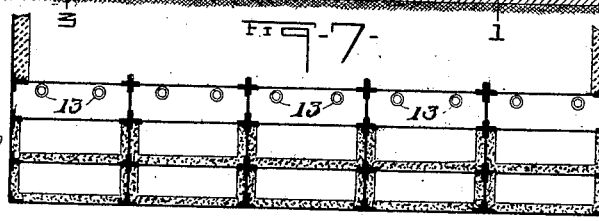
WITNESSES:
INVENTOR
David F. Nisbet
by
F. N. Barber
ATTORNEY

UNITED STATES PATENT OFFICE.

DAVID F. NISBET, OF WILKINSBURG, PENNSYLVANIA.

GAS-PURIFIER.

No. 872,576.  Specification of Letters Patent.  Patented Dec. 3, 1907.

Application filed July 8, 1907. Serial No. 382,587.

*To all whom it may concern:*

Be it known that I, DAVID F. NISBET, a citizen of the United States, residing at Wilkinsburg, in the county of Allegheny and State of Pennsylvania, have invented or discovered new and useful Improvements in Gas - Purifiers, of which the following is a specification.

This invention relates to apparatus used in connection with blast - furnaces, gas producers, etc., and intended for the preliminary cleansing of the gas by removing all the larger impurities in form of dust and a large percentage of the finer particles, and purifying the gas to a degree that will permit of its being burned in blast heating stoves or under boilers without clogging the flues of the stoves or tubes of the boilers, thus detracting from their efficiency; or my invention may be used as preliminary to further cleansing of gas for use in gas engines.

In the accompanying drawings which form a part of this specification, Figure 1 is a sectional elevation of one form of my invention showing a dust catcher, a single-pass gas-washer and a single-pass reheater; Fig. 2, a cross section on the line 2—2, Fig. 1, of the washing pass; Fig. 3, a sectional elevation of a second form of my invention showing a dust catcher, a two-pass gas-washer and a single-pass reheater; Fig. 4, a cross section on line 4—4, Fig. 3; Fig. 5, a sectional elevation of a third form of my invention showing a dust catcher, a two-pass gas-washer, and a two-pass reheater; Fig. 6, a side elevation of the same; and Fig. 7, a section on the line 7—7, Fig. 5.

Referring to Figs. 1 and 2 of the drawings, 1 is a conduit leading unpurified gases from a blast-furnace or other source into the large chamber 2 serving as a dry dust-catching element. This chamber is larger than the cross-section of the conduit in order that the gases may expand therein and deposit a large portion of the dust carried along with them. Preferably, the sides of the chamber 2 converge downwardly, the upper end being closed and the lower end being open directly over the water tank 3. The side walls and the top of the chamber 2 are double, 4 representing the washing and cooling passes which are in the side-walls, and 5 representing the gas-reheating passes in the top-wall. The passes 4 have their lower ends open and at the level of the bottom of the chamber 2 and their upper ends in communication with the passes 5 which are inclined upwardly and lead into the off-take pass or conduit 6, leading to the stoves and boilers or to other apparatus for further purification.

The tank 3 has sloping sides which meet under the center of the chamber 2, the tank being provided with skimmers 7, (see Figs. 3 and 5) which drain off through the pipes 8 and traps 9 the floating accumulations from the surface of the water in the tank. These skimmers are merely funnel-like boxes located at the water level with connection to the said waste pipes and traps. The lower ends of the traps 9 are closed by the bells $9^a$, held in place by the weighted levers $9^b$, which may be operated by wires, one, as $9^c$, being shown on Fig. 3. These wires or cords run over idle pulleys, as $9^d$, so that the outer end of each lever may be raised by a downward pull on the end of a wire. The tank 3 is provided along its bottom with a number of sludge gates 10, preferably provided with bells like those for the traps 9, the bells or gates being held in place by weighted levers, and operated by means of cords and pulleys like those used with the bells $9^a$.

In the chamber 2 are the deflecting plates or dust guides 11, which are surfaces inclined downwardly toward each other but with their inner ends not touching, so that the dust which strikes the guides will slide toward the center line of the chamber 2 and fall into the water centrally between the sides of the chamber, whereby the engagement of the particles of dust with the water will be more positively secured than if the gases took the shortest paths from the inlet conduit 1 and turned a sharp angle around the lower ends of the inner walls of the chamber.

The upper outer wall is provided with the manholes 12 opposite the passes 4 for the purpose of giving access to the passes 4 and 5 in case they should need repairing or cleaning. The upper ends of the passes 4 are provided with the perforated water pipes 13 which discharge streams of water down the passes 4 in contact with the inner surfaces of the outer side walls. These outer walls are continued vertically downward from their lower ends by the dividing flanges 14, which extend below the surface of the water in the tank. The sides of the tank and the flanges will be so proportioned that the pressure of the gases on the water between the flanges will be counterbalanced by the columns of water at the outer sides of the flanges without a discharge of water over the sides of the tank.

The hot, unpurified gases, coming from a primary dry dust catcher or direct from the blast furnace, contains an amount of dust, varying from 2 to 5 grains per cubic foot; and the quantity of gas per ton of iron produced will average 124,000 cu. ft. It is obvious that, as the presence of this dust is wholly detrimental to the use of the gas, it is desirable to eliminate it as far as possible. The gas, which has a temperature varying from 300° to 500° F., also contains a large amount of water in the form of vapor, which is also detrimental to its use; but as the use to which the gas is put, i. e., burning it in blast-heating stoves and under boilers, renders it desirable that the heat contained in the gas should be retained, while the water vapor is eliminated, and as the only practicable way by which the vapor can be eliminated economically, is by cooling the gas to a point where the vapor will be condensed, it follows that the gas must be first cooled and purified and then reheated. To do this I have devised the apparatus above described, the operation of which is as follows:—The gas is conveyed through the conduit 1 to the large chamber 2 where the velocity of the gas, by reason of the greatly increased area, is much reduced, permitting the heavier portions of the dust carried in suspension by the gas to fall by the action of gravity to the surface of the water in the tank 3, the deflecting plates 11 assisting in carrying the dust to the center of the current of gases to prevent, as far as possible, the "short-circuiting" of the dust and carrying it into the washing and cooling passes. The gases, deprived of the heavier dust and carried as shown by the arrows, are divided at the bottom of the dust catcher element and impinging on the surface of the water contained in the tank 3 lose a portion of their dust. The gases then enter the washing and cooling passes 4, passing upward through them against the streams or sheets of water which issue from the perforated pipes 13 and descend on the bottom of the passes. This passing of the gases in a direction contrary to the flow of the water, necessarily causes the gases impinging on the water to take the direction of the flow of water, thus giving the gas a rolling motion throughout these passes and bringing every portion of the gases into intimate contact with the water, which rapidly absorbs a large percentage of the dust remaining in the gas, and also partially cools the same. The gases are reheated as they go along the passes 5. The impurities on the surface of the water may be drained off from time to time by lowering the bells $9^a$ and the impurities in the bottom of the trough may be discharged by lowering the gates or bells 10 in an obvious manner.

In Fig. 3, there are no deflecting plates, but there are extra washing and cooling passes $4^a$ lying between the inner walls of the passes 4 and the additional walls 15, whose upper ends do not reach the top of the chamber, and whose lower ends extend down to the level of the lower edge of the flanges 14. A trough 16 is located at the lower end of the middle wall of the passes $4^a$ to catch the wash-water from the passes $4^a$ and convey it to the tank 3 through the pipes 17, thus preventing the gases while flowing from the passes $4^a$ to the passes 4 from flowing through sheets of water and absorbing moisture therefrom. Skimmers 7 are provided in the space between the walls 15 and in the spaces between each flange 14 and the adjacent wall 15, the pipes 8 leading to a common pipe $8^a$ having the bell $9^a$. The gases enter the chamber 2 where they deposit a portion of their dust in the water between the walls 15. From the chamber 2 the gases flow over the top of the walls 15 and down the passes $4^a$, in which they come in contact with streams of water flowing from the pipes $13^a$ down the middle walls. The gases then flow beneath the troughs 16 and impinge on the surface of the water between the flanges 14 and the walls 15, where more dust is taken from the gases. They then pass up the passes 4, and along the reheating passes 5, and out through the conduit 6, as in Fig. 1.

Referring now to Figs. 5 and 6, the parts are as in Figs. 1 and 2 except as follows: From each pass 4 the gases flow over the top of the inner wall thereof and down the pass $4^b$ which is provided with the pipe $13^b$, supplying water to the inclined floor wall thereof. The gases pass from the bottom of each pass $4^b$ beneath the inner wall thereof and up the reheating pass $4^c$, the lower ends of the inner walls of the passes 4 and $4^c$ being connected by the floor 18, so that the gases cannot touch the water while passing from the passes $4^b$ to the passes $4^c$. The top of the passes $4^c$ open into the reheating passes 5. Pipes 19 drain the water from the floor 18 into the pan 3. The gases in the conduit 1 enter the chamber 2 and descend into contact with the water in the tank 3, whence they divide and flow up the washing and cooling passes 4, curling as they go, as in Fig. 1. They then flow down the washing and cooling passes $4^b$; thence up the reheating passes $4^c$; and thence along the reheating passes 5 into the off-take conduit 6.

I claim—

1. In an apparatus of the class described, a gas receiving chamber having an open bottom, a water-tank below the chamber, a gas-washing pass in one of the walls of said chamber, means for supplying water to said pass, and a gas reheating pass contiguous to said chamber and connected to the gas-washing pass.

2. In an apparatus of the class described, a gas receiving chamber, a tank below the same, washing passes in the sides of the chamber, and reheating passes in the roof thereof.

3. In an apparatus of the class described, a gas receiving chamber, a pair of series washing passes in one wall, and reheating passes in the roof in series with the chamber and the respective washing passes.

4. In an apparatus of the class described, a gas receiving chamber, a washing pass and a reheating pass in one side wall, and a reheating pass in the roof, said passes and chamber being connected in series.

Signed at Pittsburg, Pa., this 3rd day of July, A. D. 1907.

DAVID F. NISBET.

Witnesses:
ELVA WANIEK,
F. N. BARBER.